| United States Patent [19] | [11] 3,776,604 |
|---|---|
| Ooya et al. | [45] Dec. 4, 1973 |

[54] DIGITAL TYPE BRAKE CONTROL DEVICE

[75] Inventors: Junichiro Ooya; Koji Oomura; Katsuki Takayama; Kazutaka Kuwana, all of Kariya, Japan

[73] Assignee: Aisin Seiki Kabushiki Kaisha, Kariya-shi, Japan

[22] Filed: Dec. 30, 1971

[21] Appl. No.: 214,056

[30] Foreign Application Priority Data
Dec. 30, 1970 Japan.............................. 45/129138
Dec. 30, 1970 Japan.............................. 45/129139
Dec. 30, 1970 Japan.............................. 45/129140
Dec. 30, 1970 Japan.............................. 45/129141
Dec. 30, 1970 Japan.............................. 45/129142

[52] U.S. Cl........ 303/21 EB, 188/181 C, 235/150.2, 235/177, 303/20
[51] Int. Cl.............................................. B60t 8/08
[58] Field of Search............................... 188/181 C; 235/150.2, 177; 303/20, 21; 317/5; 324/160–161; 340/146.2, 263

[56] References Cited
UNITED STATES PATENTS

| 3,620,577 | 11/1971 | Neisch et al..................... 303/21 EB |
|---|---|---|
| 3,653,727 | 4/1972 | Kullberg et al..................... 303/21 P |
| 3,608,978 | 9/1971 | Neisch........................... 303/21 EB |
| 3,586,385 | 6/1971 | Florus et al.............. 303/21 EB UX |
| 3,589,776 | 6/1971 | Wehde..................... 303/21 CF UX |
| 3,679,894 | 7/1972 | Smith.............................. 303/20 X |

OTHER PUBLICATIONS
IBM Technical Disclosure Bulletin, "Computer and Apparatus For Measuring Rotational Speed", by Bederman, Vol. 13, No. 4, September 1970, pp. 1017, 1018.

*Primary Examiner*—Milton Buchler
*Assistant Examiner*—Stephen G. Kunin
*Attorney*—Holman & Stern

[57] ABSTRACT

Digital type brake control devices, each comprising a suitable combination of a first block adapted to detect rotational conditions of rotating wheels, a second block comprising a clock pulse circuit and producing a control signal, a third block comprising a computation circuit, a fourth block comprising a sensing pulse difference setting circuit, a fifth block comprising a compensation circuit for compensating a pulse difference computation, a sixth block comprising a circuit for limiting time period of a pressure reducing signal, and a seventh block comprising a circuit for driving a valve adapted to reduce brake oil pressure, said blocks being connected and arranged so that number of pulses obtained by the first block is counted in accordance with the control signal produced by the clock pulse circuit of the second block and the brake pressure is controlled by the circuit of the seventh block through the circuit of the sixth block in accordance with signals obtained by the circuit of the third and fourth blocks. In the above improved devices, a "nand" element is further connected in the clock pulse generating circuit or a circuit for limiting time period of the pressure reducing signal thereby to provide a circuit adapted to limit the time period of the pressure reducing signal.

13 Claims, 24 Drawing Figures

FIG. 2

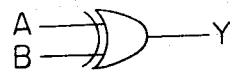

| INPUT | | OUTPUT |
|---|---|---|
| A | B | Y |
| L | L | L |
| L | H | H |
| H | L | H |
| H | H | L |

FIG. 3

| COUNT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| D | L | L | L | L | L | L | L | L | H | H | H | H | H | H | H | H |
| C | L | L | L | L | H | H | H | H | L | L | L | L | H | H | H | H |
| B | L | L | H | H | L | L | H | H | L | L | H | H | L | L | H | H |
| A | L | H | L | H | L | H | L | H | L | H | L | H | L | H | L | H |

(OUTPUT)

FIG. 4

| INPUT | | | | OUTPUT | | | | | | | | | | INPUT | | | | OUTPUT | | | | | | | | | |
|---|---|---|---|---|---|---|---|---|---|---|---|---|---|---|---|---|---|---|---|---|---|---|---|---|---|---|---|
| D | C | B | A | 0 | 1 | 2 | 3 | 4 | 5 | 6 | 7 | 8 | 9 | D | C | B | A | 0 | 1 | 2 | 3 | 4 | 5 | 6 | 7 | 8 | 9 |
| L | L | L | L | L | H | H | H | H | H | H | H | H | H | L | L | L | L | H | H | H | H | H | H | H | H | L | H |
| L | L | L | H | H | L | H | H | H | H | H | H | H | H | L | L | L | L | H | H | H | H | H | H | H | H | H | L |
| L | L | H | L | H | H | L | H | H | H | H | H | H | H | L | L | H | L | H | H | H | H | H | H | H | H | H | H |
| L | L | H | H | H | H | H | L | H | H | H | H | H | H | L | L | H | H | H | H | H | H | H | H | H | H | H | H |
| L | H | L | L | H | H | H | H | L | H | H | H | H | H | L | H | L | L | H | H | H | H | H | H | H | H | H | H |
| L | H | L | H | H | H | H | H | H | L | H | H | H | H | L | H | L | H | H | H | H | H | H | H | H | H | H | H |
| L | H | H | L | H | H | H | H | H | H | L | H | H | H | L | H | H | L | H | H | H | H | H | H | H | H | H | H |
| L | H | H | H | H | H | H | H | H | H | H | L | H | H | L | H | H | H | H | H | H | H | H | H | H | H | H | H |

FIG. 5A

| T | Q Q̄ |
|---|---|
|   | R S |

FIG. 5B

| S | R | Q | Q̄ |
|---|---|---|---|
| L | L | H | H |
| L | H | H | L |
| H | L | L | H |
| H | H | Qn | Q̄n |

FIG. 6A

| T | Q Q̄ S |
|---|---|
|   | D |

FIG. 6B

| tn | tn + 1 | |
|---|---|---|
| D | Q | Q̄ |
| L | L | H |
| H | H | L |

FIG. 6C

| S | Q | Q̄ |
|---|---|---|
| L | H | L |

FIG. 12A

| COUNT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| OUTPUT A OF COUNTER B1 | L | H | L | H | L | H | L | H | L | H | L | H | L | H | L | H |
| OUTPUT B OF COUNTER B1 | L | L | H | H | L | L | H | H | L | L | H | H | L | L | H | H |
| OUTPUT C OF COUNTER B1 | L | L | L | L | H | H | H | H | L | L | L | L | H | H | H | H |
| OUTPUT D OF COUNTER B1 | L | L | L | L | L | L | L | L | H | H | H | H | H | H | H | H |
| OUTPUT A OF COUNTER B2 | L | L | L | L | L | L | L | L | L | L | L | L | L | L | L | L |
| OUTPUT B OF COUNTER B2 | L | L | L | L | L | L | L | L | L | L | L | L | L | L | L | L |
| OUTPUT C OF COUNTER B2 | L | L | L | L | L | L | L | L | L | L | L | L | L | L | L | L |
| OUTPUT D OF COUNTER B2 | L | L | L | L | L | L | L | L | L | L | L | L | L | L | L | L |
| OUTPUT OF "NAND" ELEMENT M11 | H | H | H | H | H | H | H | H | H | H | H | H | H | H | H | H |
| OUTPUT D OF DECODER G1 | H | L | H | L | H | L | H | L | H | L | H | L | H | L | H | L |
| OUTPUT 0 OF DECODER G1 | H | L | H | H | H | H | H | H | H | H | H | H | H | H | H | H |
| OUTPUT 1 OF DECODER G1 | H | H | H | L | H | H | H | H | H | H | H | H | H | H | H | H |
| OUTPUT 2 OF DECODER G1 | H | H | H | H | H | L | H | H | H | H | H | H | H | H | H | H |
| OUTPUT 3 OF DECODER G1 | H | H | H | H | H | H | H | L | H | H | H | H | H | H | H | H |
| OUTPUT 4 OF DECODER G1 | H | H | H | H | H | H | H | H | H | L | H | H | H | H | H | H |
| OUTPUT 5 OF DECODER G1 | H | H | H | H | H | H | H | H | H | H | H | L | H | H | H | H |
| OUTPUT 6 OF DECODER G1 | H | H | H | H | H | H | H | H | H | H | H | H | H | L | H | H |
| OUTPUT 7 OF DECODER G1 | H | H | H | H | H | H | H | H | H | H | H | H | H | H | H | L |
| OUTPUT 0 OF DECODER G2 | L | L | L | L | L | L | L | L | L | L | L | L | L | L | L | L |
| OUTPUT 1 OF DECODER G2 | H | H | H | H | H | H | H | H | H | H | H | H | H | H | H | H |

FIG.12B

| COUNT | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| OUTPUT A OF COUNTER B1 | L | H | L | H | L | H | L | H | L | H | L | H | L | H | L | H |
| OUTPUT B OF COUNTER B1 | L | L | H | H | L | L | H | H | L | L | H | H | L | L | H | H |
| OUTPUT C OF COUNTER B1 | L | L | L | L | H | H | H | H | L | L | L | L | H | H | H | H |
| OUTPUT D OF COUNTER B1 | L | L | L | L | L | L | L | L | H | H | H | H | H | H | H | H |
| OUTPUT A OF COUNTER B2 | H | H | H | H | H | H | H | H | H | H | H | H | H | H | H | H |
| OUTPUT B OF COUNTER B2 | L | L | L | L | L | L | L | L | L | L | L | L | L | L | L | L |
| OUTPUT C OF COUNTER B2 | L | L | L | L | L | L | L | L | L | L | L | L | L | L | L | L |
| OUTPUT D OF COUNTER B2 | L | L | L | L | L | L | L | L | L | L | L | L | L | L | L | L |
| OUTPUT OF "NAND" ELEMENT M11 | L | L | L | L | L | L | L | L | L | L | L | L | L | L | L | L |
| OUTPUT D OF DECODER G1 | H | H | H | H | H | H | H | H | H | H | H | H | H | H | H | H |
| OUTPUT 0 OF DECODER G1 | H | H | H | H | H | H | H | H | H | H | H | H | H | H | H | H |
| OUTPUT 1 OF DECODER G1 | H | H | H | H | H | H | H | H | H | H | H | H | H | H | H | H |
| OUTPUT 2 OF DECODER G1 | H | H | H | H | H | H | H | H | H | H | H | H | H | H | H | H |
| OUTPUT 3 OF DECODER G1 | H | H | H | H | H | H | H | H | H | H | H | H | H | H | H | H |
| OUTPUT 4 OF DECODER G1 | H | H | H | H | H | H | H | H | H | H | H | H | H | H | H | H |
| OUTPUT 5 OF DECODER G1 | H | H | H | H | H | H | H | H | H | H | H | H | H | H | H | H |
| OUTPUT 6 OF DECODER G1 | H | H | H | H | H | H | H | H | H | H | H | H | H | H | H | H |
| OUTPUT 7 OF DECODER G1 | H | H | H | H | H | H | H | H | H | H | H | H | H | H | H | H |
| OUTPUT 0 OF DECODER G2 | H | H | H | H | H | H | H | H | H | H | H | H | H | H | H | H |
| OUTPUT 1 OF DECODER G2 | L | L | L | L | L | L | L | L | L | L | L | L | L | L | L | L |

FIG. 12C

| COUNT | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| | 48 | | | | | ~ | | | | | | | | | | 63 |
| | 64 | | | | | ~ | | | | | | | | | | 79 |
| | 80 | | | | | ~ | | | | | | | | | | 95 |
| | 96 | | | | | ~ | | | | | | | | | | 111 |
| | 112 | | | | | ~ | | | | | | | | | | 127 |
| | 128 | | | | | ~ | | | | | | | | | | 143 |
| | 144 | | | | | ~ | | | | | | | | | | 159 |
| | 160 | | | | | ~ | | | | | | | | | | 175 |
| | 176 | | | | | ~ | | | | | | | | | | 191 |
| | 192 | | | | | ~ | | | | | | | | | | 207 |
| | 208 | | | | | ~ | | | | | | | | | | 223 |
| | 224 | | | | | ~ | | | | | | | | | | 239 |
| | 240 | | | | | ~ | | | | | | | | | | 255 |
| OUTPUT A OF COUNTER B1 | L | H | L | H | L | H | L | H | L | H | L | H | L | H | L | H |
| OUTPUT B OF COUNTER B1 | L | L | H | H | L | L | H | H | L | L | H | H | L | L | H | H |
| OUTPUT C OF COUNTER B1 | L | L | L | L | H | H | H | H | L | L | L | L | H | H | H | H |
| OUTPUT D OF COUNTER B1 | L | L | L | L | L | L | L | L | H | H | H | H | H | H | H | H |
| OUTPUT A OF COUNTER B2 | | | | | | | | | | | | | | | | |
| OUTPUT B OF COUNTER B2 | | | | | | | | | | | | | | | | |
| OUTPUT C OF COUNTER B2 | | | | | | | | | | | | | | | | |
| OUTPUT D OF COUNTER B2 | | | | | | | | | | | | | | | | |
| OUTPUT OF "NAND" ELEMENT M11 | L | L | L | L | L | L | L | L | L | L | L | L | L | L | L | L |
| OUTPUT D OF DECODER G1 | H | H | H | H | H | H | H | H | H | H | H | H | H | H | H | H |
| OUTPUT 0 OF DECODER G1 | H | H | H | H | H | H | H | H | H | H | H | H | H | H | H | H |
| OUTPUT 1 OF DECODER G1 | H | H | H | H | H | H | H | H | H | H | H | H | H | H | H | H |
| OUTPUT 2 OF DECODER G1 | H | H | H | H | H | H | H | H | H | H | H | H | H | H | H | H |
| OUTPUT 3 OF DECODER G1 | H | H | H | H | H | H | H | H | H | H | H | H | H | H | H | H |
| OUTPUT 4 OF DECODER G1 | H | H | H | H | H | H | H | H | H | H | H | H | H | H | H | H |
| OUTPUT 5 OF DECODER G1 | H | H | H | H | H | H | H | H | H | H | H | H | H | H | H | H |
| OUTPUT 6 OF DECODER G1 | H | H | H | H | H | H | H | H | H | H | H | H | H | H | H | H |
| OUTPUT 7 OF DECODER G1 | H | H | H | H | H | H | H | H | H | H | H | H | H | H | H | H |
| OUTPUT 0 OF DECODER G2 | H | H | H | H | H | H | H | H | H | H | H | H | H | H | H | H |
| OUTPUT 1 OF DECODER G2 | H | H | H | H | H | H | H | H | H | H | H | H | H | H | H | H |

DIGITAL TYPE BRAKE CONTROL DEVICE

BACKGROUND OF THE INVENTION

The present invention relates to a digital type brake control device, in which a signal corresponding to the travelling distance of a wheel is detected, and the thus detected signal is processed by a computer, whereby a digital signal is thoroughly employed as a control signal which is used for controlling a control section, without converting said control signal into an analog signal. In various conventional electrical anti-skid devices, a computer adapted to judge the revolution conditions of a wheel is essentially formed with an analog circuit. Therefore, a device has been employed, in which the revolution conditions of the wheel is detected as a pulse signal (digital signal) by a sensor (detector), said digital signal is smoothed and converted into an analog signal, and this analog signal, after having been processed by a computer, is applied as an on-off signal (digital signal) to an actuator adapted to control the brake force of the wheel.

The conventional device mentioned above involves various disadvantages. That is, since performance of a computer is influenced by variation of characteristics of the elements forming an analog circuit, provision of a temperature compensating circuit adapted to compensate a temperature drift caused by the temperature dependability of said elements, a circuit adapted to convert a digital signal into an analog signal, and a constant-voltage circuit having high accuracy are essentially required for said conventional device. In addition, variation with time in the characteristics of the elements exerts a bad influence upon the performance of the computer, and performance of various computers are different from one another because of uniformity in the characteristics of the manufactured elements forming said computers. Therefore, the conventional device is not suitable for the mass production. Furthermore, it is known that use of integrated circuits contributes to miniaturization of the whole circuit and the circuit is superior in an economical view point and in an operational dependability. However, it is not practical to employ the integrated circuit for the analog circuit, because it is necessary to assemble inductors and capacitors having large capacity in the circuit and to regulate severely fluctuation of the constructional elements such as resistors and capacitors, when compared with the case where the integrated circuits are employed in the digital circuit.

In addition to the above, in the conventional antiskid device, each sensor mounted on each drive or driven wheel is necessarily provided with its own independent addition and subtraction circuit.

In order to overcome the above-mentioned disadvantages, it has been proposed a digital type brake control device, in which the computer for judging revolution conditions of the wheels to be braked is composed of a digital circuit adapted to discriminate high and low input signals, namely "1" and "0" and there is provided a conversion circuit adapted to add and amplify signals furnished from a plurality of sensors provided on a plurality of wheels to be controlled, whereby said device is made to carry out sufficient control with only one addition and subtraction circuit even in the case when the sensors are mounted on a plurality of wheels. This control device has been improved, according to the present invention, by converting outputs produced from a plurality of sensors and corresponding to revolutions of two wheels into pulses thereby to obtain an output in one circuit, thus causing possibility of election of a plurality of pulses and revolution conditions of two wheels.

For overcoming the above-mentioned conventional disadvantages, it has been proposed another digital type brake control device, in which the computer is composed of a digital circuit adapted to discriminate high and low input signals, namely "1" and "0", and there is provided a circuit capable of simultaneously carrying out addition and subtraction of pulse number corresponding to wheel travelling distance during a predetermined period of time from a certain time instant and pulse number corresponding to wheel travelling distance during the predetermined period of time from another time instant differring from the former time instant, whereby adoption of integrated circuits is simplified, constuction of the circuit is simplified, and high speed operation and operation accuracy are secured. This proposed device has been improved according to this invention by utilizing a pulse difference computing circuit for obtaining a difference between pulse number for a unit time Tn and pulse number for a limited unit time ($Tn + r$), thereby to shorten the unit time period. As an improved digital type brake control device adapted to eliminate the conventional drawbacks mentioned already, it has been further proposed a device, in which the computer is composed of a digital circuit adapted to discriminate high and low input signals, namely, "1" and "0" thereby to simplify the application of integrated circuits to the device so that simple addition or separation of the integrated circuits may be attained according to necessity. This proposed device has been improved, according to this invention, by providing a circuit for setting sensed pulse difference, in which adjustment of output of a flip-flop of a pulse difference computing circuit is made possible by adjusting the sensing level to a predetermined set level, whereby discriminating control of low and high $\mu$ paths is made possible and when a brake is gradually applied to the wheels within a range below a value locking the wheels, this condition is sensed and controlled. As a further improved digital type brake control device adapted to eliminate the conventional drawbacks mentioned already, it has been proposed a device, in which the computer is composed of a digital circuit adapted to discriminate high and low input signals, namely, "1" and "0" and a circuit for automatically varying sensing level in accordance with the wheel revolution speed so that the most appropriate control can be attained even if a brake is imparted to the wheels in any revolution speeds of the wheels. This proposed device has been improved, according to this invention, by providing a compensation circuit which can automatically compensate pulse difference computation in accordance with pulse variation by adjusting on-off time of the gate of "nand" element of the pulse difference computing circuit so that optimum control can be attained even if a brake is applied to the wheels in any revolution speed of the wheels.

SUMMARY OF THE INVENTION

An object of the present invention is to improve the conventional digital type brake control devices mentioned already and more particularly to obtain a digital type brake control device comprising a circuit adapted to convert the outputs produced from many sensors and corresponding to the revolution numbers of two wheels into pulses and put together into one input, thereby to make it possible to detect a great number of pulses and to detect the revolution conditions of two wheels. This object has been attained, as shown in the first block I in FIG. 1, by a digital type brake control device having a circuit composition, in which revolution conditions of two rotating structures are detected and converted into square wave pulses, and the both square waves obtained through waveform-shaping circuits are, respectively, applied to an exclusive "or" element thereby to obtain addition of their frequencies, the building-up and building-down of the thus obtained square waves being differentiated by differentiation circuits and the wave form of the thus differentiated square waves being shaped through a mono-stable multi-vibrator circuit, whereby a pulse having a frequency twice as many as that obtained by the exclusive "or" element is obtained.

Another object of the present invention is to obtain another improved digital type brake control device which comprises a particular pulse difference computing circuit adapted to obtain a difference between pulse number for a unit time Tn and pulse number for a limited unit time ($Tn+r$), thereby to shorten the unit time period in comparison with the conventional case, in which a difference between a unit time Tn and another unit time ($Tn+1$) is obtained. This object has been attained, as will be described in detail in connection with the block III of FIG. 1 and diagram of FIG. 10, by a system, in which a pulse difference computation circuit is provided, whereby a difference between pulse number for a unit time T and that for a limited unit time ($Tn+r$) is obtained, and said latter pulse number is increased by reducing the brake oil pressure when said difference exceeds a set value, and when said difference becomes zero, the brake oil pressure is restored, thereby to shorten the computation period.

A further object of the present invention is to obtain a further improved digital type brake control device which comprises a circuit for setting a sensed pulse difference, in which adjustment of output of a flip-flop of a pulse difference computing circuit is made possible by adjusting the sensing level to a predetermined set level, whereby discriminating control of low and high $\mu$ paths is made possible and when a brake is gradually applied to the wheels within a range below a value locking the wheels, this condition can be sensed and controlled.

A still further object of the present invention is to obtain a still further improved digital type brake control device which comprises, in addition, a "nand" element connected to a clock-pulse generating circuit or to a circuit for limiting time period of a pressure reducing signal, whereby effective provision of said circuit for limiting time period of a pressure reducing signal is made possible.

A still another object of the present invention is to provide a still another improved digital type brake control device which comprises a compensation circuit adapted to compensate automatically the pulse difference computation in accordance with pulse variation and to adjust on-off time of a gate of a "nand" element included in the pulse computation circuit so that an appropriate control can be attained even if a brake is imparted to wheels in any wheel revolution speed, whereby discriminating control of the low and high $\mu$ paths is make possible and when a brake is gradually applied for within a locking limit, this condition can be sensed and controlled.

BRIEF DESCRIPTION OF THE DRAWINGS

In the accompanying drawings:

FIG. 2 is a diagram showing truth values of an exclusive "or" element;

FIG. 3 is a diagram showing truth values of a 4-bit binary counter;

FIG. 4 is a diagram indicating truth values of a binary coded decimal decoder;

FIGS. 5A and 5B are diagrams illustrating truth values of a flip-flop which can be set and reset;

FIGS. 6A, 6B, and 6C are diagrams showing truth values of a D type edge trigger flip-flop;

FIG. 12(A), (B) and (C) are diagrams showing pulses of an oscillating circuit;

FIG. 13 is a diagram showing operation of the block IV in FIG. 1;

FIG. 14 is a diagram showing operation of the block V in FIG. 1;

DETAILED DESCRIPTION OF THE INVENTION

Figure 1:
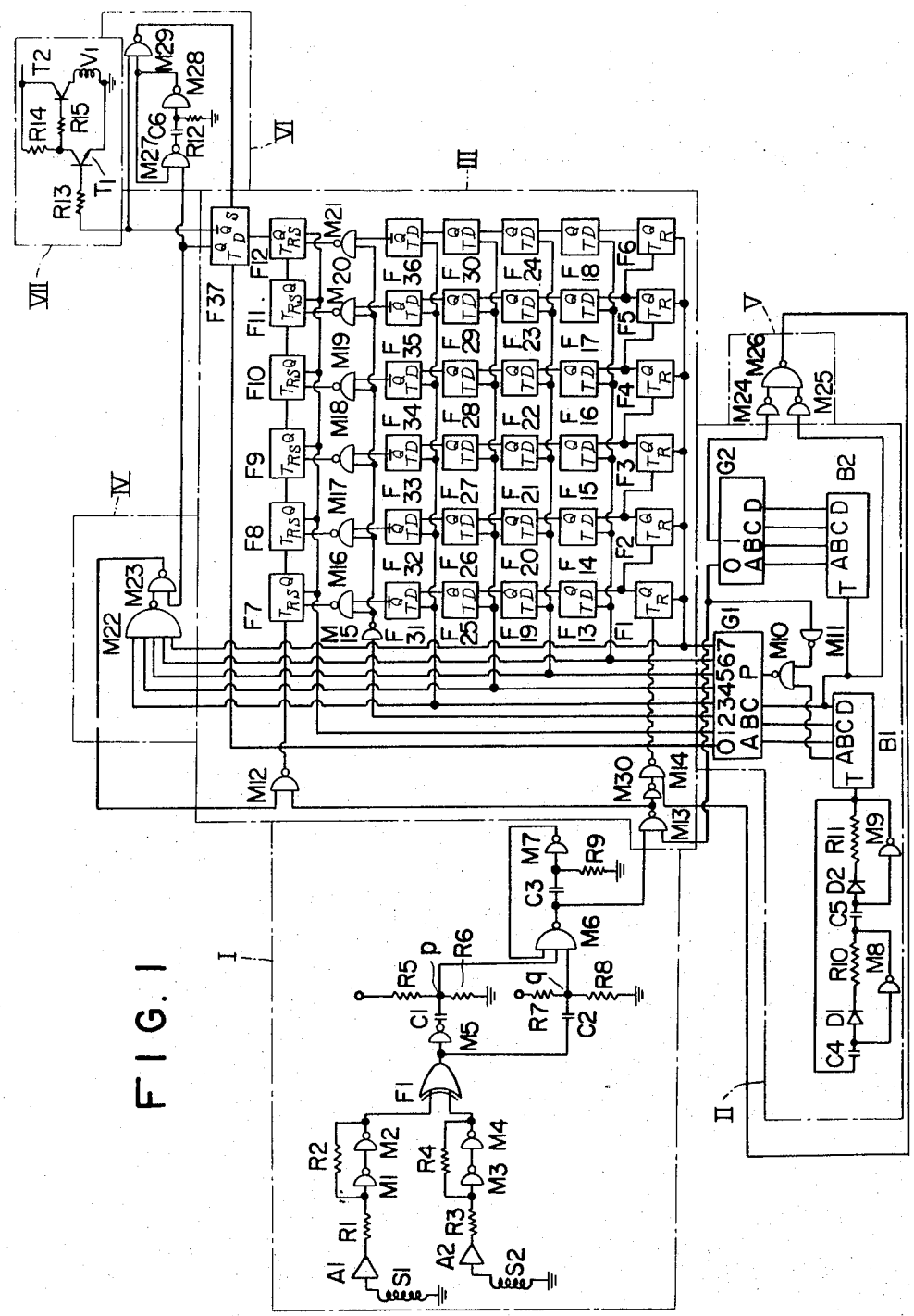
FIG. 1 is a circuit diagram of an embodiment of the present invention.

With reference now to FIG. 1, block I is provided with sensors S1 and S2 of the publicly well-known type which are adapted to generate sine wave voltages corresponding to the revolution number of wheels, respectively, said sensors S1 and S2 being mounted respectively on wheels, for instance, on two rear wheels which are subjected to an anti-skid control, and members A1 and A2 are current amplifiers which may be any of the operation amplifier, linear IC amplifier, and transistor circuit amplifier. An exclusive "or" element E1 has an exclusive "or" function. Now, if it is assumed that a high potential is represented by H and a low potential by L, truth values of the exclusive "or" element E1 are as shown by FIG. 2. In FIG. 1, "nand" elements M1 through M30 have amplification and "nand" functions, and their outputs become L, only when all of their inputs are H, and when any one of their inputs is L, their outputs will be H even if the number of the L input is only one.

Counters B1 and B2 shown in block II of FIG. 1 are 4-bit binary counters, and their truth values are shown in FIG. 3. Decoders G1 and G2 in the block II are binary coded decimal decoders and their truth values are as shown in FIG. 4. Flip-flops F1 through F12 shown in block III of FIG. 1 are flip-flops which have resetting and setting functions. Their truth values are as shown in FIG. 5B. In FIG. 5A, reference symbol T is a trigger terminal, Q a "1" terminal $\bar{Q}$ a "0" terminal, R a reset terminal, and S a set terminal. The set terminal S is H, and when no wiring is made to the set terminals S, the terminal is H. Qn inverses a condition of the flip-flop presented immediately before the trigger terminal T becomes L from H, that is, Qn inverses the condition whenever the flip-flop receives a pulse. Flip-flops F13 through F37 are D type edge trigger flip-flops and their truth values are shown in FIG. 6. In FIG. 6A, reference symbol D is a D type edge trigger. In FIG. 6B, symbol "tn" is a bit time before a clock pulse and "tn+1" is a bit time after a clock pulse. When a trigger input is L, information is introduced as input, and when the trigger input becomes H, the action of the flip-flop is effected.

The embodiment according to the present invention comprises blocks I through VII as shown in FIG. 1.

The block I is a circuit in which outputs generated from each of the sensors in correspondence to the revolution number of each wheel are converted into pulses and then the thus obtained pulses are put together into one output. More specifically, the output side of the sensor S1 is connected to the input side of the amplifier A1, and the output side of the amplifier A1 is in turn connected to the input side of a conventional wave-form-shaping circuit comprising resistors R1 and R2 and "nand" elements M1 and M2, and then the output side of the wave-form-shaping circuit is connected to an input side of an exclusive "or" element E1. On the other hand, the output from the sensor S2 is applied to the other input side of the exclusive "or" element E1 in the same connection way as in the sensor S1 (where A1 is read as A2, R1 as R3, R2 as R4, M1 as M3 and M2 as M4 to realize or understand said same connection way). The output side of the exclusive "or" element E1 is connected to the input side of the "nand" element M5 and also to the input side of a conventional differentiation circuit comprising a capacitor C2 and resistors R7 and R8. The output side of the "nand" element M5 is connected to the input side of another differentiation circuit comprising a capacitor C1 and resistors R5 and R6. The output sides of the differentiation circuits are connected to input sides of the "nand" element M6, respectively. The "nand" elements M6 and M7, a capacitor C3 and a resistor R9 form, in combination, a conventional mono-stable multivibrator circuit. The output side of the "nand" element M6 is connected to an input side of the "nand" element M13 included in the block III.

The block II is a clock-pulse generating circuit, and capacitors C4 and C5, diodes D1 and D2, resistors R10 and R11, and "nand" elements M8 and M9 compose a conventional oscillating circuit. The output side of the oscillating circuit is connected to the input terminal T of a counter B1.

Output terminals A, B and C of the counter B1 are respectively connected to an input side of the "nand" element M10, an input terminal A of the decoder G1, and an input terminal B of the decoder G1. An output terminal D of the counter B1 is connected to an input terminal C of the decoder G1, the input terminal T of the counter B2 and the input terminal of the "nand" element M25 included in block V. The outputs A, B, C and D of another counter B2 are connected to the input terminals A, B, C and D of the decoder G2, respectively.

In the block II, the output terminals 0, 1 and 2 of the decoder G1 are connected to an input terminal T of a flip-flop 37 in the block III, an input terminal of each of the flip-flops F7 through F12, and an input terminal of the "nand" element M15, respectively. An output terminal 3 of the decoder G1 is connected to input terminals T of flip-flops F31 through F36 and an input terminal of the "nand" element M22 in the block IV. An output terminal 4 of the decoder G1 is connected to an input terminal T of each of the flip-flops F25 through F30, and an input terminal of the "nand" element M22 is the block IV. An output terminal 5 of the decoder G1 is connected to an input terminal T of each of the flip-flops F19 through F24 and to an input terminal of the "nand" element M22 in the block IV. An output terminal 6 of the decoder G1 is connected to input terminals T of the flip-flops F13 to F18 and to an input terminal of the "nand" element M22 in the block IV. An output terminal 7 of the decoder G1 is connected to input terminals R of the flip-flops F1 to F6 and to an input terminal of the "nand" element M22.

Furthermore, in the block II, the output terminal 0 of the decoder G2 is connected to an input terminal of the "nand" element M11 and to an input terminal of the "nand" element M13 in the block III, while the output terminal 1 of the decoder G2 is connected to an input terminal of the "nand" element M24 in the block V. The output terminal of the "nand" element M11 is connected to an input terminal of the "nand" element M10.

The block III is a pulse difference computing circuit, and the output terminal of the "nand" element M13 is connected to an input terminal of the "nand" element M30 and to an input terminal of the "nand" element M12. The output terminal of the "nand" element 30 is connected to an input terminal of the "nand" element M14 and the flip-flops F1 through F6 compose a conventional 6-bit binary addition counter.

The output terminal of the "nand" element M14 is connected to an input terminal of the above-mentioned 6-bit binary addition counter. Similarly, the combination of the flip-flops F7 through F12 composes a 6-bit binary subtraction counter, and an output terminal of the "nand" element M12 is connected to an input terminal of said 6-bit binary subtraction counter. The output terminals Q of the flip-flops F1, F2, F3, F4, F5 and F6 are connected to the input terminals D of the flip-flops F13, F14, F15, F16, F17 and F18, respectively. Furthermore, the output terminals Q of the flip-flops F13, F14, F15, F16, F17 and F18 are connected to the input terminals D of the flip-flops F19, F20, F21, F22, F23 and F24, respectively, and the output terminals Q of the flip-flops F19, F20, F21, F22, F23 and F24 are connected to the input terminals D of the flip-flops F25, F26, F27, F28, F29 and F30, respectively.

The output terminals Q of the flip-flops F25 through F30 are connected to the input terminals D of the flip-flops F31 through F36, respectively. In addition, the output terminals $\bar{Q}$ of the flip-flops F31 through F36 are connected to input terminals of the "nand" elements M16 through M21, respectively, and output terminal of the "nand" element M15 is connected to respective input terminals of the "nand" elements M16 through M21. The output terminals of the "nand" elements M16 through M21 are connected to the input terminals R of the flip-flops F7 through F12, respectively.

The output terminal Q of the flip-flop F12 is connected to an input terminal D of the flip-flop F37. An output terminal Q of the flip-flop F37 is connected to an input terminal of the "nand" element M23 in the block IV and to an input terminal of the "nand" element M27 in the block VI, while another output terminal $\bar{Q}$ of the flip-flop F37 is connected to a resistor R13 in the block VII and to an input terminal of the "nand" element M29.

The block IV is a sensing pulse difference setting circuit. An output terminal of the "nand" element M22 is connected to an input terminal of a "nand" element M23, and an output terminal of the element M23 is in turn connected to an input terminal of the "nand" element M12 in the block III.

The block V is a pulse difference computation correcting circuit which utilizes a wheel revolution speed. An output terminal of the "nand" element M24 is connected to an input terminal of a "nand" element M26, while the output terminal of the "nand" element M25 is connected to an input terminal of the "nand" element M26. Furthermore, an output terminal of the element M26 is connected to an input terminal of the "nand" element M14 in the block III.

The block VI is a pressure-reduction signal time controlling circuit, in which "nand" elements M27 and M28, a capacitor C6 and a resistor R12 compose, in combination, a conventional mono-stable multivibrator circuit. An output terminal of the "nand" element M28 is connected to an input terminal of the "nand" element M29, and an output terminal of the element M29 is in turn connected to an input terminal S of the flip-flop F37 in the block III.

The block VII is a circuit for driving a brake-oil-pressure reducing valve, in which a valve $V_1$ serves to reduce a brake oil pressure when an electric current flows through said valve $V_1$, and to restore the brake oil pressure when no current flows through the valve $V_1$. A resistor R13 is connected to the base of a transistor T1. The emitter of the transistor T1 is grounded, and the collector thereof is connected to resistors R14 and R15. The resistor R14 is connected to an electric source, and the resistor R15 is connected to the base of a transistor T2. The emitter of the transistor T2 is connected to the electric source, while the collector of the transistor T2 is grounded through the valve $V_1$.

Figure 7:
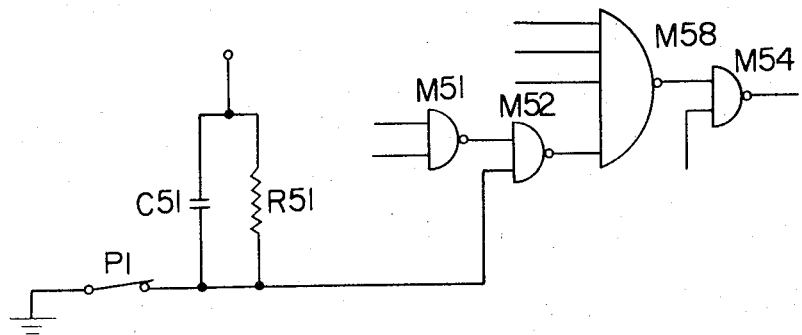
FIG. 7 is a diagram exhibiting another embodiment of the block IV shown in FIG. 1.

Now, a modified embodiment of the block IV is shown in FIG. 7, in which a pressure switch P1 is opened when a master cylinder oil pressure or a wheel cylinder oil pressure is higher than a set pressure value, and is closed when said oil pressure is lower than said set pressure value. One of the terminals of the pressure switch P1 is grounded and the other terminal is connected to one of the terminals of a capacitor C51, one of the terminals of a resistor R51, and an input terminal of a "nand" element M52, and the other terminals of the capacitor C51 and resistor R51 are connected to the electric source. Any two output terminals, for instance, output terminals 6 and 7, among the output terminals 3, 4, 5, 6 and 7 of the decoder G1 in the block II are connected to input terminals of a "nand" element M51, respectively; while other three output terminals, for instance, the output terminals 3, 4 and 5 which are not connected to the input terminals of the "annd" element M51 are connected to input terminals of a "nand" element M53, respectively. The output terminals of the "nand" elements M51, M52, M53 and M54 are connected to input terminals of the "nand" elements M52, M53, M54 and an input terminal of the "nand" element M12 in the block III, respectively. The output terminal Q of the flip-flop F37 in the block III is connected to the other input of the element M54.

Figure 8:
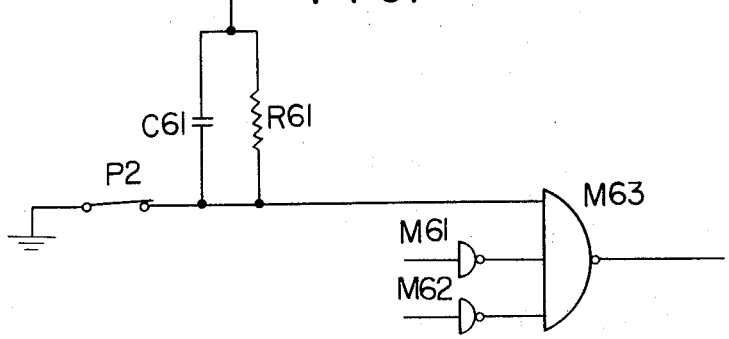
FIG. 8 is a diagram showing another embodiment of the block V included in FIG. 1.

One modified embodiment of the block V is shown in FIG. 8, in which a pressure switch P2 is opened when a master cylinder oil pressure or a wheel cylinder oil pressure is higher than a set pressure value, and is closed when lower than said set pressure value. One of the terminals of the pressure switch P2 is grounded and the other terminal is connected to one of the terminals of a capacitor C61, one of the terminals of a resistor R61, and an input terminal of a "nand" element M63. The other terminals of the capacitor C61 and resistor R61 are connected to the electric source. An input terminal of a "nand" element M61 is connected to one output terminal 1 of the decoder G2 in the block II, while an input terminal of a "nand" element M62 is connected to the output terminal D of the counter B1 in the block II. An output terminal of the "nand" element M61 is connected to an input terminal of a "nand" element M63, and an output terminal of the "nand" element M62 is in turn connected to another input terminal of the element M63. The output element of the element M63 is in turn connected to an input terminal of the "nand" element M14 in the block III.

Figure 9:
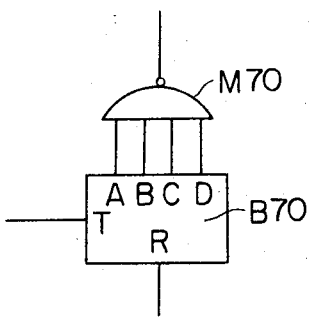
FIG. 9 shows another embodiment of the block VI included in FIG. 1.

Referring now to FIG. 9, there is shown another embodiment of the block VI, in which there is provided a counter B70 corresponding to a 4-bit binary counter, and its truth values are the same as shown in FIG. 3. When the input R becomes L, all the output terminals A, B, C and D are reset to L.

An input terminal T of the counter B70 is connected to the output terminal C of the counter B2, while an output terminal R of the counter B70 is connected to the output terminals $\bar{Q}$ of the flip-flop F37. Furthermore, output terminals A, B, C and D of the counter B70 are connected to input terminals of a "nand" element M70, respectively. An output terminal of the element M70 is in turn connected to the input terminals 8 of the flip-flop F37 in the block III.

Figure 10:
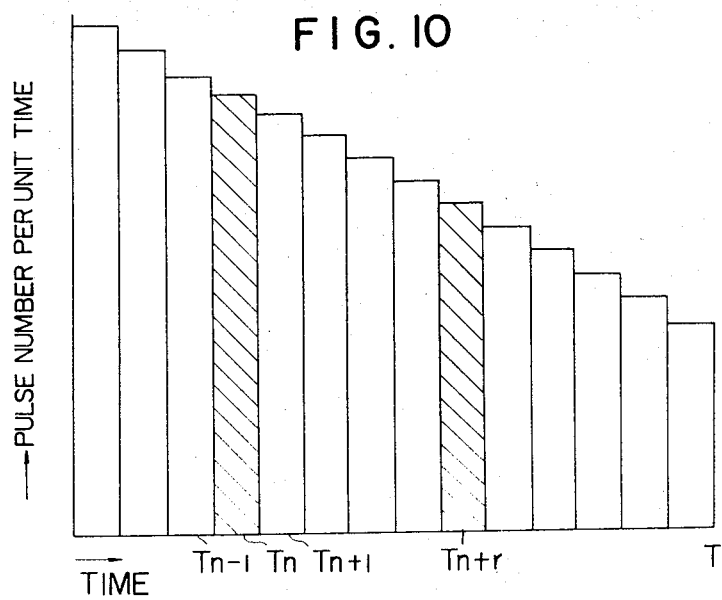
FIG. 10 is a graphic diagram showing relationships between number of pulses per unit time period and time in the case of pulse difference computation.

With reference now to FIG. 10, a pulse difference computation method according to the present invention will be described below. Number of pulses corresponding to the revolution number of a wheel for a unit time period is counted at all times. Also, difference between the number of pulses for a unit time $(Tn+r)$ and that for a unit time $Tn$ is obtained at all times. When the number of pulses for the unit time $(Tn+r)$ becomes small and said difference becomes greater than a predetermined numerical value, a brake oil pressure is reduced. As a result, the number of pulses for the unit time $(Tn+r)$ is increased, and when the number of pulses for the unit time $(Tn+r)$ becomes equal to that of $Tn$, the brake oil pressure is restored.

One of the specific features of the present invention resides in this computation method, that is, the unit time period can be made shorter than the conventional method in which difference between the number of pulses for a unit time Tn and that for a unit time (Tn+1) is obtained.

Now, let it be assumed that the unit time of the computation method according to the present invention is represented by TA and that of the conventional computation method mentioned above is represented by TB, and furthermore the predetermined number of pulses is represented by Δp; for explanation of the following description;

In the method of the present invention; a wheel revolution speed difference of Δ p/TA is obtained for a time period of 5TA, if r is put as 5 (r=5) for convenience of computation or explanation. On the other hand, in the conventional method; when a wheel revolution speed difference of Δ p/TB is obtained for a time period of TB, the brake pressure is reduced. Accordingly, the following equation is obtained.

$$\frac{\frac{\Delta p}{TA}}{5TA} = \frac{\frac{\Delta p}{TB}}{TB}$$

or $TA = 1/\sqrt{5}\ TB = 0.4472\ TB$ Thus, it is proved that the method of the present invention can make the unit time shorter. In this embodiment of the present invention, difference between the number of pulses for the unit time (Tn+5) and that for a unit time Tn is obtained. However, it should be noted that, this is merely one example, and the effects of the present invention can be obtained by obtaining difference between the number of pulses for a unit time period of at least (Tn+2) and that of Tn.

Figure 11:
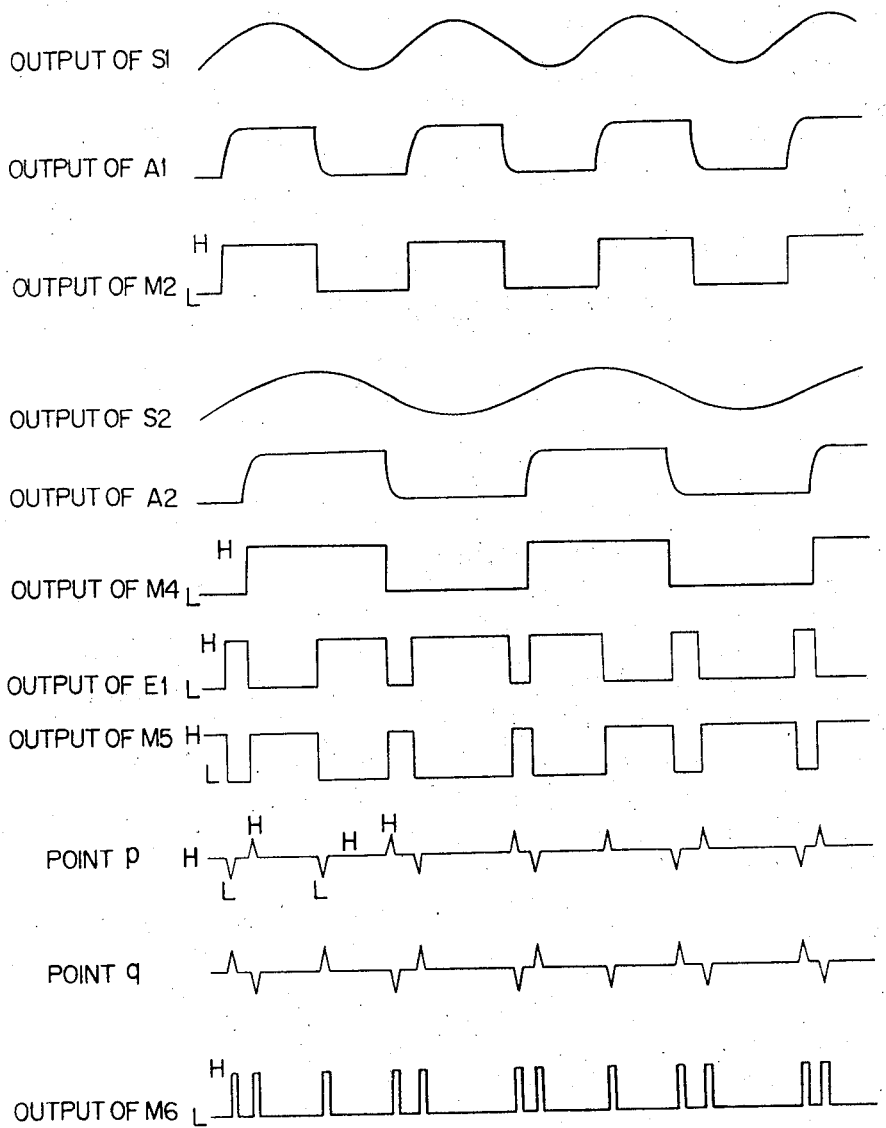
FIG. 11 illustrates wave form diagrams pertaining to the block I included in FIG. 1.

Operation of the present invention is as follows:

In the block I, outputs of the sensors S1 and S2 adapted to generate their outputs corresponding to the revolution numbers of wheels are amplified through the amplifiers A1 and A2, respectively, and then wave forms of the outputs thus amplified are shaped by conventional wave-form shaping circuits, respectively, thereby to obtain pulse wave forms corresponding to the wheel revolution numbers. One of said circuits is formed by the resistors R1 and R2, and the "nand" elements M1 and M2; while the other is similarly formed by the resistors R3 and R4, and the "nand" elements M3 and M4. The two pulse wave forms thus obtained are put together through the exclusive "or" element E1 thereby to obtain one pulse waveform signal. After the building-up and building-down of the pulse have been differentiated through the differentiation circuits, respectively, the pulse is fed to the pulse difference computation circuit in the block III through the monostable multivibrator circuit. The abovementioned conditions are shown in FIG. 11.

In the block II, counting, up to 255 from 0, of the pulses generated by the oscillating circuit is repeated by the counters B1 and B2, thereby to produce the outputs 0 to 7 of the decoder G1 and also the outputs 0 and 1 of the decoder G2 as shown in FIG. 12. The block III is controlled by these outputs.

Now, operations of the blocks III, IV and V will be described.

The block IV operates as shown in FIG. 13. The output of the "nand" element M23 becomes an input of the "nand" element M12, said output of the element M23 being varied depending on the condition of the output Q of the flip-flop F37 included in the block III.

Operation of the block V is as shown in FIG. 14, in which the output of the "nand" element M26 becomes an input of the "nand" element M14 in the block III.

Figure 15:
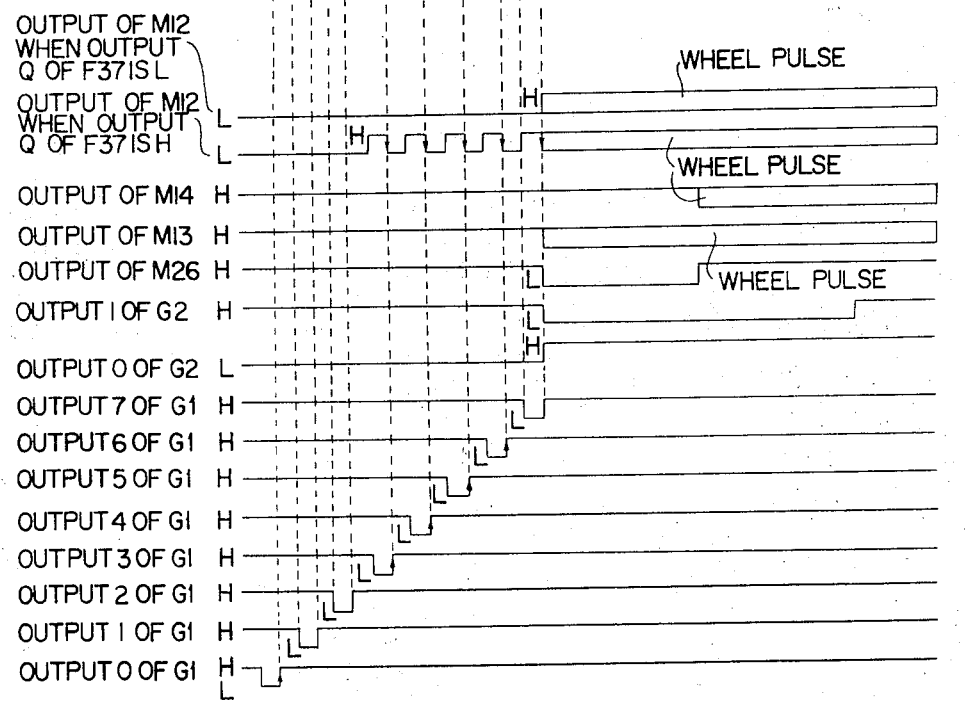
FIG. 15 is a diagram showing operation of the block III in FIG. 1.

The block III operates as shown in FIG. 15. When the flip-flops F1 through F6 count the output of the "nand" element M14 for the unit time Tn, the output of the element M14 produces wheel pulses only for a period of counts 24 to 255 for the unit time Tn as shown in FIG. 15. In other words, the wheel-pulses for the period only is counted by the flip-flops. Next, when it comes to the unit time (Tn+1), the conditions as counted by the flip-flops F1 through F6 for the unit time Tn are transferred to the flip-flops F13 through F18, and wheel pulses for the unit time (Tn+1) are counted by the flip-flops F1 through F6. Then, when it comes to the unit time (Tn+2), the flip-flops F19 through F24 obtain the conditions as counted by the flip-flops F1 through F6 for the unit time Tn, and the flip-flops F13 through F18 take the condition as counted by the flip-flops F1 through F6 for the unit time (Tn+1), and furthermore the flip-flops F1 through F6 count wheel pulses for the unit time (Tn+2). Next, when it comes to the unit time (Tn+3), the flip-flops F25 through F30 obtain the conditions as counted by the flip-flops F1 through F6 for the unit time Tn, the flip-flops F19 through F24 obtain the conditions as counted by the flip-flops F1 through F6 for the unit time (Tn+1), the flip-flops F13 through F18 obtain the conditions as counted by the flip-flops F1 through F6 for the unit time (Tn+2), and the flip-flops F1 and F6 count pulses for the unit time (Tn+3).

Now, when it comes to the unit time (Tn+4), the flip-flops F31 through F36 obtain the conditions as counted by the flip-flops F1 through F6 for the unit time Tn, the flip-flops F25 through F30 obtain the conditions as counted by the flip-flops F1 through F6 for the unit time (Tn+1), the flip-flops F19 through F24 obtain the conditions as counted by the flip-flops F1 through F6 for the unit time (Tn+2), the flip-flops F13 through F18 obtain the conditions as counted by the flip-flops F1 through F6 for the unit time (Tn+3), and the flip-flops F1 through F6 count wheel pulses for the unit time (Tn+4).

Next, when it comes to the unit time (Tn+5), the condition of the flip-flop F12 is transferred to the flip-flop F37 as it is at the time of count 1, and at the time of count 3 all the flip-flops F7 through F12 are set up, that is, the outputs Q become H while the output $\bar{Q}$ becomes L. At the time of count 5, the only flip-flops (among the flip-flops F7 through F12) corresponding to the flip-flops (among the flip-flops F31 through F36) the outputs $\bar{Q}$ of which become H are all reset up and their outputs $\bar{Q}$ become H. In this case, the flip-flops F7 through F12 forming a subtraction counter do not give any influence to the next flip-flop operation, because their outputs $\bar{Q}$ become H from L. In other words, at both times of counts 3 and 5, the number of wheel pulses counted by the flip-flops F1 through F6 for a period of count 24 to 255 during the unit time Tn is transferred to the flip-flops F7 through F12, and the flip-flops F7 through F12 serve to subtraction-count the output pulse signal of the "nand" element M12 until receiving a setting signal from the time of count 6. In the case when the output Q of the flip-flop F37 is changed to H, the output of the element M12 serves to produce five pulse signals for a period of counts 7 to 15 and a wheel pulse for a period of counts 16 to 255 as shown in FIG. 15. Therefore, the flip-flops F7 to F12 subtract five for the period of 7 to 15 from the number of wheel pulses which have been counted by the flip-flops F1 to F6 for a period of counts 3 to 5 during the unit time Tn, and furthermore the subtraction operation is performed with the number of wheel pulses produced for a period of counts 16 to 255 during the unit time (Tn+5). As a result, in the case when the subtraction is greater, the flip-flops F7 to F12 forming the subtraction counter become negative in condition and the output Q of the flip-flop F12 becomes H. In the case when the subtraction is smaller, said flip-flops F7 to F12 becomes positive in condition and the output Q of said flip-flop F12 becomes L. When the output Q of the flip-flop 37 is changed to L, the output of the "nand" element M12 serves to produce a wheel-pulse fo the period of counts 16 to 255 as shown in FIG. 15. Therefore, the flip-flops F7 to F12 serve to subtract the number of wheel pulses produced for the period of counts 16 to 255 during the unit time (Tn+5) from the number of wheel pulses counted by the flip-flops F1 to F6 for the period of counts 3 and 5 during the unit time Tn. And, in the case when the subtraction is greater, the flip-flops F7 to F12 forming the subtraction counter become negative in condition and the output Q of the flip-flop F12 becomes H. In the case when the subtraction is smaller, the flip-flops F7 to F12 becomes positive in condition and the output Q of the flip-flop F12 becomes L.

The above-described operations are summarized as follows:

1. In the case when the output Q of the flip-flop F37 is H;

when a result of (the number of wheel pulses for the period of counts 24 to 255 during the unit time Tn) − 15 + (the number of wheel pulses for the period of counts 16 to 23 during the unit time Tn+5) + (the number of wheel pulses for the period of counts 24 to 255 during the unit time Tn+5)} is positive in value, the output Q of the flip-flop F37 becomes L and the output $\bar{Q}$ thereof becomes H; and when said result is negative, the output Q of the flip-flop F37 becomes H and the output $\bar{Q}$ thereof become L.

2. In the case when the output Q of the flip-flop F37 is L;

when a result of (the number of wheel pulses for the period of 24 to 255 during the unit time Tn) − {(the number of wheel pulses for the period of counts 16 to 23 during the unit time (Tn+5) + (the number of wheel pulses for a period of counts 24 to 255 during the unit time Tn+5)} is positive in value, the output Q of the flip-flop F37 becomes L and the output $\bar{Q}$ thereof becomes H; and when said result is negative, the output Q of the flip-flop F37 becomes H and the output $\bar{Q}$ thereof becomes L.

Operation of the block VI will be described, as follows.

Figure 16:
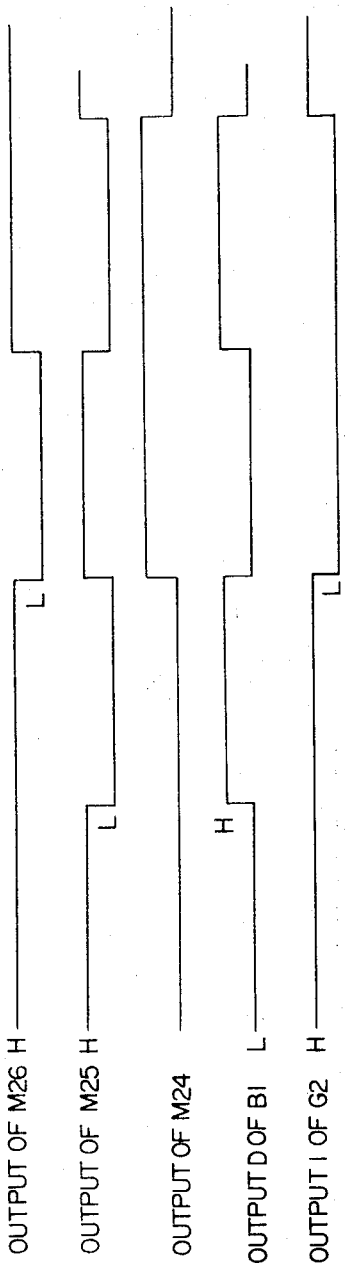
FIG. 16 is a diagram showing operation of the block VI in FIG. 1.

The block VI is a circuit which serves to forcibly set the flip-flop F-37 of the block III thereby to make the outputs Q and $\bar{Q}$ thereof to be H and L, respectively, in the case when the condition such that the outputs Q and $\bar{Q}$ of the flip-flop F37 are respectively L and H is longer than the time required for a setting operation of the mono-stable vibrator circuit in the block VI. Operation of this block VI is shown in FIG. 16.

Operation of the seventh block will be described in the following.

When the output $\bar{Q}$ of the flip-flop F37 in the block III is H, the transistor $T_1$ becomes conductive, the base potential of the transistor T2 is lowered and said transistor T2 also becomes conductive. As a result of which, a current flows through the valve $V_1$ thereby to cause reducement of the brake oil pressure. On the contrary, when the output $\bar{Q}$ of the flip-flop F37 in the block III is L, the transistor T1 becomes non-conductive, the base potential of the transistor T2 is raised and said transistor T2 becomes non-conductive. As a result of which no current flows through the valve $V_1$, whereby the brake oil pressure is restored.

Described below is actual operation of the whole parts of the first embodiment according to the present invention.

In the case when the output $\bar{Q}$ of the flip-flop F37 of the block III becomes H upon application of the electric source to the circuit of the present invention, the circuit of the block VI serves to make the output $\bar{Q}$ to be L. In addition to the above, in the case when steady running condition of the circuit is established, a result of "$(a) − \{5 + (b)+(c)\}$" will be $−\{5 + (b)\}$ because $(a) \approx (c)$ due to the steady running condition: where $(a)$ is (the number of wheel pulses for the period of counts 24 to 255 during the unit time Tn), $(b)$ is (the number of wheel pulses for the period of counts 16 to 23 during the unit time Tn+5), and $(c)$ is (the number of wheel pulses for the period of counts 24 to 255 during the unit time Tn+ 5). The number of wheel pulses for the period of counts 16 to 23 during the unit time (Tn+5) is the number of pulses which are proportional to a wheel speed, and said number of pulses is approximately five in the case when the wheel speed is 100 km/h. The number of pulses thus produced can be set as required by varying the circuit of the fifth block V. Therefore, the result of the subtraction becomes negative in value, and so the output $\bar{Q}$ of the flip-flop F37 becomes L. As a result, no current flows through the valve $V_1$ of the block VII, so that the wasteful signal for reducing brake oil pressure is not produced. Now, when a slow or moderate brake action adapted not to lock the wheels is applied to the wheels, the number of wheel pulses for the period of counts 24 to 255 during the unit time (Tn+5) becomes smaller than the number of wheel pulses for the period of counts 24 to 255 during the unit Tn, does not exceed 5 + (the number of wheel pulses for the period of counts 16 to 23 during the unit time Tn+5). Therefore, in this case also, the result of the above subtraction becomes negative, and therefore the output Q of the flip-flop F37 becomes L and no current flows through the valve $V_1$ of the block VII, so that the brake oil pressure is not reduced.

Next, when an abrupt brake action is applied to the extent that will lcok the wheels, the number of wheel pulses for the period of counts 24 to 255 during the unit time (Tn+5) becomes much smaller than the number of wheel pulses for the period of counts 24 to 255 for the unit time Tn, and becomes greater than {5 + (the number of wheel pulses for the period of counts 16 to 23 during the unit Tn+5)}. As a result, the result of the subtraction becomes positive in value, and the outputs $\bar{Q}$ and Q of the flip-flop F37 become H and L, respectively, whereby a current flows through the valve $V_1$ in the block VII and the brake oil pressure is reduced. On the other hand, the computation circuit of the block III operates to obtain a result of (the number of wheel pulses for the period of counts 24 to 255 during the unit time $Tn$) − {(the number of wheel pulses for the period of 16 to 23 during the unit time $Tn+5$) + (the number of wheel pulses for the period of counts 24 to 255 during the unit time $Tn+5$)}.

A road reaction force caused by the reduction of the brake oil pressure has tendency to increase the wheel speed. Difference between the number of wheel pulses for the period of counts 24 to 255 during the unit time ($Tn+5$) and the number of wheel pulses for the period of counts 24 to 255 during the unit time $Tn$ gradually becomes smaller. When the former becomes smaller than the number of wheel pulses for the period of counts 16 to 23 during the unit time ($Tn+5$), said difference becomes negative in value, whereby the output $\bar{Q}$ of the flip-flop F37 becomes L. In addition, no current flows through the valve $V_1$ in the block VII, and therefore the brake oil pressure is restored. Besides, the computation circuit of the block III starts to obtain the result of (the number of wheel pulses for the period of counts 24 to 255 during the unit time $Tn$) −{5 + (the number of wheel pulses for the period of counts 16 to 23 during the unit time $Tn+5$) + (the number of wheel pulses for the period of counts 24 to 255 during the unit time $Tn+5$)}, again.

It becomes possible by repetition of the above-described operation to prevent the wheel from locking and to obtain an effective brake force therefor.

In the case when the wheel runs at a speed of, for instance, 100 km/h, the number of pulses closed to 200 must be counted, so that eight bits are required for the number of bits of the flip-flops F1 to F6 which serve to count the number of wheel pulses.

In the present invention, however, the number of bits as many as a difference number required for computation of the difference is necessary. In other words, in the embodiments according to the present invention, a difference number more than 60 obtained by adding 30 of reduction side and 30 of acceleration side is not involved in an actual case. Therefore, 6-bits is sufficient.

Now, described below is a modified application of the block IV shown in FIG. 7.

Figure 17:
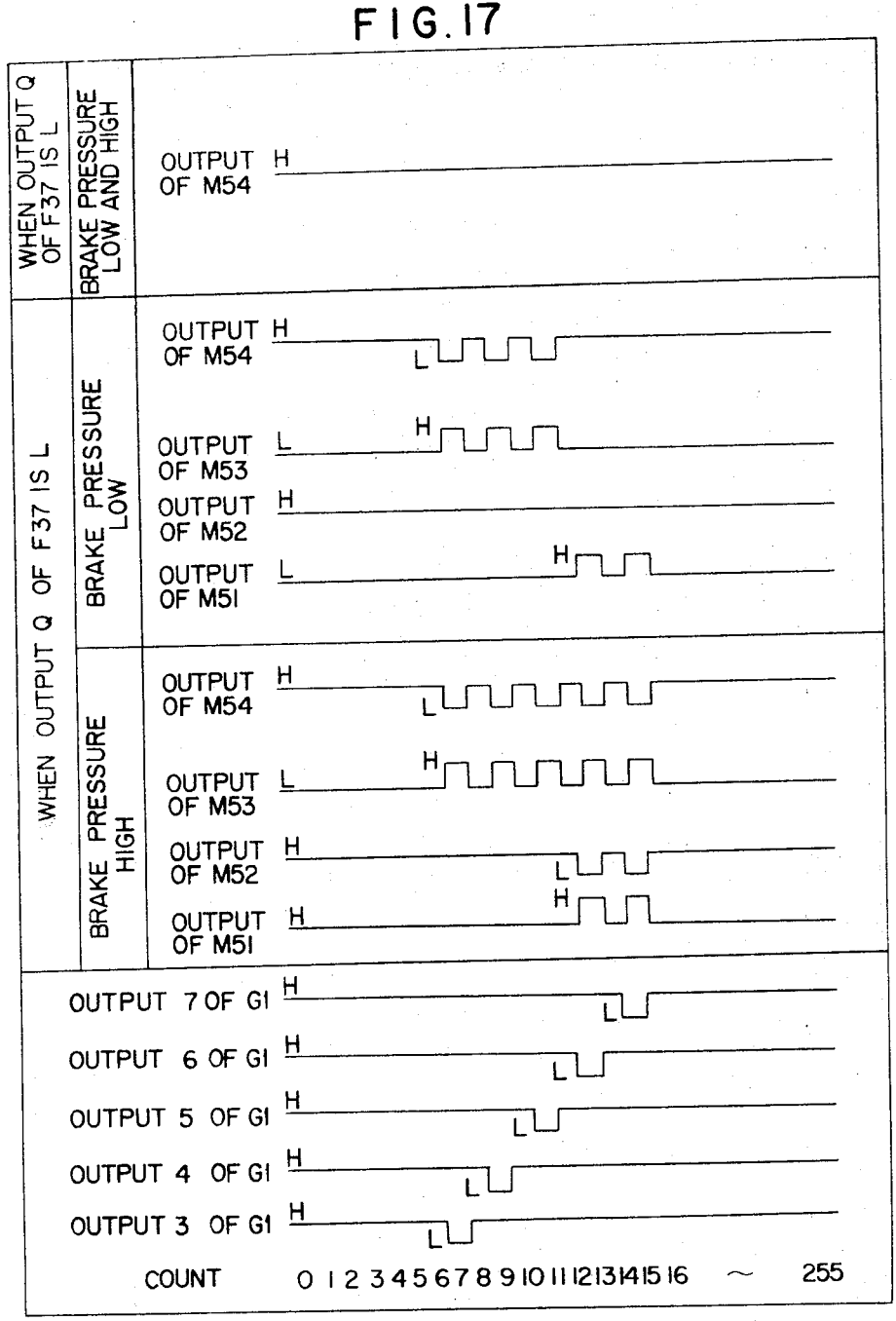
FIG. 17 is a diagram showing operation of the embodiment shown in FIG. 7.

As described previously, the predeterminded number of pulse difference is fixed to be 5 with block IV of the first embodiment. However, in the modified embodiment described below, the predetermined number of pulse difference is changed, for instance, from 5 to 3 depending on the master cylinder oil pressure or wheel cylinder oil pressure. The modified embodiment aims to increase a sensing capability in the case when the brake oil pressure is slowly applied so as to slowly lock the wheels. The operating conditions of the modified embodiment are as shown in FIG. 17, in which the capacitor C51 and resistor R51 are provided for preventing a noise which might be caused during the operation.

Figure 18:
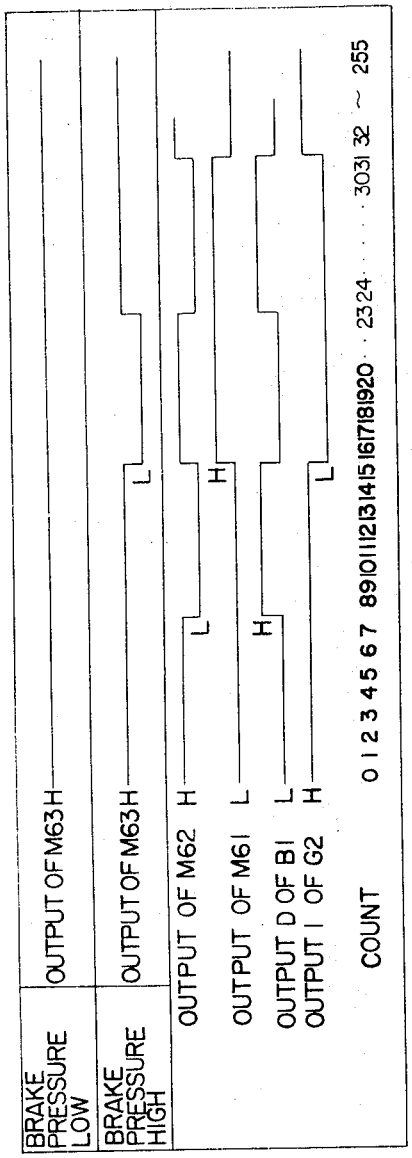
FIG. 18 is a diagram illustrating operation of the embodiment shown in FIG. 8.

With reference now to FIG. 18, operation of a modified embodiment of the block V will be illustrated below:

In the first embodiment of the block V, a sensing pulse difference is made greater at a high speed revolution of the wheel by changing the time period during which the flip-flops F7 to F12 composing the subtraction counter and the flip-flops F1 to F6 composing the addition counter count the number of wheel pulses. However, the object of the modified embodiment described herein resides in that, when the master cylinder oil pressure or wheel cylinder oil pressure is low, said both counters are made to count at the same time so as to eliminate the increase of the sensing pulse difference in the high speed, and thereby to increase the sensing capability in the case of the slowly locking operation of the wheel by a slow application of the brake oil pressure. The operating conditions of the modified embodiment are shown in FIG. 18.

Figure 19:
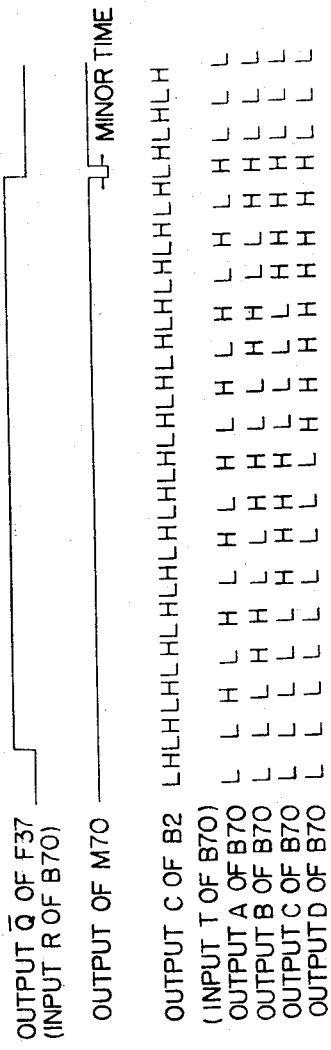
FIG. 19 is a diagram explaining operation of the embodiment shown in FIG. 9.

In FIG. 19, there is shown operation conditions of another embodiment of the block VI, said embodiment being proposed to increase its dependability by using a binary coded 4-bits counter instead of the monostable multi-vibrator circuit. When a brake-pressure-reducing signal from the block III is received by the block VI, that is, the output $\bar{Q}$ of the flip-flop F37 becomes H, the input R of the counter B70 becomes H and the output C of the counter B2 is counted. When the signal H is abnormally long and all the outputs A, B, C and D of the counter 70 become H, the output $\bar{Q}$ of the flip-flop F37 makes the output of the "nand" element M70 to be L, and the output $\bar{Q}$ of the flip-flop F37 is set to L. When the output $\bar{Q}$ of the flip-flop F37 is shorter than the state of the signal H, the input R of the counter B70 is reset to L during the counting operation of the counter B70.

Since the present invention provides the circuit arrangement such as described above, the present invention can readily detect pulses much more than the case of the other brake control devices, whereby for instance, a clock pulse frequency of the block II can be increased and the computation period of the block III can be made quicker. In other words, a response characteristic in sensing the wheel revolution condition is improved. Furthermore, improvement of a brake feeling and shortening of a brake distance are obtained as general effects according to the present invention.

Furthermore, according to the present invention, opening and closing period of the input gate included in the pulse difference computation circuit can be automatically corrected in a simple and accurate manner by using a simple circuit adapted to correct pulse difference computation.

In addition to the above simple circuit, according to the invention output of the flip-flop included in the pulse difference computation circuit can be automatically adjusted to a predetermined set level by using a sense pulse difference setting circuit of simple structure. That is, if let it be assumed that oil pressure of a master cylinder is used as a sensing means, when a brake is gradually applied to the wheels within the range below locking value, said braking action can be controlled by sensing said condition; and on the other hand, if it is assumed that oil pressure of the wheel cylinder is used as the sensing means, discrimination of high and low $\mu$ paths can be attained and also when the brake is gradually applied to the wheels within the range below locking value, said braking action can be controlled by sensing said condition, whereby gentle locking of the wheels can be particularly removed, thus causing excellent braking effect along all kinds of road surfaces.

Still furthermore, according to the present invention, there is provided a flip-flop circuit adapted to always detect and count difference between pulse number per unit time $Tn$ and pulse number per limited unit time ($Tn+r$), so that in comparison with the case of conventional circuits adapted to detect difference between pulse number per unit time Tn and pulse number per unit time (T$n$+1), the unit time period can be made shorter and also even though pulse number is limited to a value corresponding to the unit time (T$n$+$r$) the same effect as the case using pulse number larger than said limited pulse number can be obtained. Moreover, it is possible detect easily an abrupt revolution condition of the wheels, thus causing improvement of feeling and shortening of the brake distance.

We claim:

1. In a digital type brake control device comprising a first block adapted to detect the rotational conditions of rotating wheels, a second block comprising a clock pulse circuit and producing control signals, a third block comprising a computation circuit, a seventh block comprising a circuit for driving a valve adapted to reduce brake oil pressure, said blocks being connected and arranged so that the number of pulses obtained by the first block is counted in accordance with the control signals produced by the clock pulse circuit of the second block and brake pressure is controlled by the circuit of the seventh block in accordance with signals obtained by the circuit of the third block; an improvement characterized by that said first block comprises sensors which produce respectively signals corresponding to rotational speeds of the wheels, waveform-shaping circuits which are respectively connected to said sensors and carry out respectively the waveform-shaping of the output signals of said sensors, and an exclusive "OR" circuit connected to said waveform-shaping circuits so as to receive output signals of said wave-form-shaping circuit for producing an output equal to the sum of the output signals of said waveform-shaping circuits.

2. A digital type brake control device as claimed in claim 1, in which said device comprises further, in combination, a fourth block comprising a sensing pulse difference setting circuit, a fifth block comprising a compensation circuit for compensating a pulse difference computation, and a sixth block comprising a circuit for limiting time period of a pressure reducing signal, and controlling of the brake pressure by the circuit of the seventh block is carried out through the circuit of the sixth block in accordance with signals obtained by the circuits of the third and fourth blocks.

3. In a digital type brake control device comprising, in combination, a first block adapted to detect the rotational conditions of rotating wheels, a second block comprising a clock pulse circuit and producing control signals, a third block comprising a computation circuit which counts the number of pulses produced by said first block in accordance with the control signals produced by said second block, and a seventh block comprising a circuit for driving a valve adapted to reduce brake oil pressure and adapted to control the brake pressure in accordance with the signal obtained by said third block; an improvement comprising a fifth block comprising a compensation circuit for compensating a pulse difference computation, said compensation circuit comprising first, second and third "nand" elements input sides of said first and second "nand" elements being connected to respective output sides of a decoder circuit and a counter circuit which are included in the clock-pulse generating circuit of the second block, output sides of said first and second "nand" elements being connected to input side of said third "nand" element, and output side of said third "nand" element being connected to input gate circuit of the third block.

4. In a digital type brake control device comprising, in combination, a first block adapted to detect the rotational conditions of rotating wheels, a second block comprising a clock pulse circuit and producing control signals, a third block comprising a computation circuit which counts the number of pulses produced by said first block in accordance with the control signals produced by said second block, and a seventh block comprising a circuit for driving a valve adapted to reduce brake oil pressure and adapted to control the brake pressure in accordance with the signal obtained by said third block; an improvement comprising a compensation circuit adapted to compensate the pulse difference counting so as to make it possible to adjust the time during which the input gate of the third block is opened, said compensation circuit comprising "nand" elements connected respectively in parallel to a decoder circuit and a counter circuit which are included in the clock pulse generating circuit of the second block, another "nand" element input sides of which are connected to output sides of said former "nand" elements and a brake oil pressure switch, output side of said another "nand" element being connected to input side of said third block.

5. A digital type brake control device as claimed in claim 4, in which said device comprises further, in combination, a fourth block comprising a sensing pulse difference setting circuit, and a sixth block comprising a circuit for limiting time period during which a pressure reducing signal is established, and controlling of the brake oil pressure by the circuit of the seventh block is carried out in accordance with the signals obtained by said third and fourth blocks.

6. In a digital type brake control device comprising, in combination, a first block adapted to detect the rotational conditions of rotating wheels, a second block comprising a clock pulse circuit and producing control signals, a third block comprising a computation circuit which counts the number of pulses produced by said first block in accordance with the control signals produced by said second block, and a seventh block comprising a circuit for driving a valve adapted to reduce brake oil pressure and adapted to control the brake pressure in accordance with the signals obtained by said third block; an improvement characterized by that said third block comprises a first flip-flop circuit adapted to count successively the number of pulses corresponding to a revolution within a unit time period in each of the wheels, said counting being made in response to said control signals produced by said second block, at least one group of the second flip-flop circuits which are adapted to be controlled by said control signals produced by said second block and which are connected so that the number of pulses counted at said first flip-flop circuit is successively transferred to said second flip-flop circuits upon lapse of said unit time period, and a third flip-flop circuit adapted to be controlled by said control signals produced by said second block so as to receive the number of pulses produced by said second flip-flop circuit and adapted to count number of pulses corresponding respectively to revolutions, within a predetermined time period, of the wheels, thereby to detect difference between pulse number counted during said unit time period by means of said first flip-flop circuit and pulse number counted during said predetermined time period which is delayed from said unit time period by a certain time period.

7. A digital type brake control device as claimed in claim 6, in which said device comprises further, in combination, a fourth block comprising a sensing pulse difference setting circuit, a fifth block comprising a compensation circuit for compensating a pulse difference computation, and a sixth block comprising a circuit for limiting time period during which a pressure reducing signal is established, controlling of the brake pressure is carried out by the circuit of the seventh block in accordance with the signals obtained by said third and fourth blocks.

8. In a digital type brake control device comprising, in combination, a first block adapted to detect the rotational conditions of rotating wheels, a second block comprising a clock pulse circuit and producing control signals, a third block comprising a computation circuit which counts the number of pulse produced by said first block in accordance with the control signals produced by said second block, a fourth block comprising a sensing pulse difference setting circuit, a sixth block comprising a circuit for limiting time during which a pressure reducing signal is established, and a seventh block comprising a circuit for driving a valve adapted to reduce brake oil pressure and adapted to control the brake pressure in accordance with the signals obtained by said third and fourth blocks; an improvement according to which the circuit adapted to limit a time period of a pressure reducing signal and included in the sixth block comprises a "nand" element and a monostable multivibrator circuit, input side of said "nand" element being connected to output side of a flip-flop circuit included in the computation circuit of the third block through said monostable multivibrator circuit, and output side of said " nand" element being connected to an input terminal of said flip-flop circuit.

9. A digital type brake control device as claimed in claim 8, in which said device comprises further, in combination, a fifth block comprising a compensation circuit for compensating a pulse difference computation in the computation circuit of the third block.

10. In a digital type brake control device comprising, in combination, a first block adapted to detect the rotational conditions of rotating wheels, a second block comprising a clock pulse circuit and producing control signals, a third block comprising a computation circuit which counts the number of pulses produced by said first block in accordance with the control signals produced by said second block, a fourth block comprising a sensing pulse difference setting circuit, a sixth block comprising a circuit for limiting time during which a pressure reducing signal is established, and a seventh block comprising a circuit for driving a valve adapted to reduce brake oil pressure and adapted to control the brake pressure in accordance with the signals obtained by said third and fourth blocks; an improvement according to which the circuit adapted to limit a time period of a pressure reducing signal and included in the sixth block comprises a counter including input terminals connected respectively to the "nand" element, one output terminal of the counter of said second block and output terminal of the flip-flop circuit included in the third block and adapted to produce brake-pressure controlling signals, plural output terminals of said counter being connected to said "nand" element and output side of this "nand" element being connected to said flip-flop circuit which produces the brake-pressure controlling signal.

11. In a digital type brake control device comprising, in combination, a first block adapted to detect the rotational conditions of rotating wheels, a second block comprising a clock pulse circuit and producing control signals, a third block comprising a computation circuit which counts the number of pulses produced by said first block in accordance with the control signals produced by said second block, a fourth block comprising a sensing pulse difference setting circuit, and a seventh block comprising a circuit for driving a valve adapted to reduce brake oil pressure and adapted to control the brake pressure in accordance with the signals obtained by said third and fourth blocks; an improvement comprising a sensing pulse difference setting circuit included in the fourth block and comprises a first "nand" element being connected to respective output sides of decoders included in the clock pulse generating circuit of the second block and output side of said first "nand" element and output side of the flip-flop circuit included in the computation circuit of the third block are connected to input side of said second "nand" element, output side of said second "nand" element being connected to said third block.

12. A digital type brake control device as claimed in claim 11, in which said device comprises further, in combination, a fifth block comprising a compensation circuit for compensating a pulse difference computation and a sixth block comprising a circuit for limiting time period during which a pressure reducing signal is established.

13. A digital type brake control device as claimed in claim 11, in which number of the input terminals in the input side of the first "nand" element is made to be adjusted in accordance with value of the brake oil pressure.

* * * * *